(12) United States Patent
Schumann et al.

(10) Patent No.: US 10,120,073 B2
(45) Date of Patent: Nov. 6, 2018

(54) METHOD FOR OPERATING A SURROUNDINGS-DETECTION SYSTEM OF A VEHICLE

(71) Applicant: Robert Bosch GmbH, Stuttgart (DE)

(72) Inventors: Michael Schumann, Stuttgart (DE); Marcus Schneider, Ludwigsburg (DE); Dirk Schmid, Simmozheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 297 days.

(21) Appl. No.: 14/900,340

(22) PCT Filed: Apr. 8, 2014

(86) PCT No.: PCT/EP2014/057025
§ 371 (c)(1),
(2) Date: Dec. 21, 2015

(87) PCT Pub. No.: WO2014/202251
PCT Pub. Date: Dec. 24, 2014

(65) Prior Publication Data
US 2016/0154104 A1 Jun. 2, 2016

(30) Foreign Application Priority Data
Jun. 21, 2013 (DE) .................. 10 2013 211 846

(51) Int. Cl.
*G01S 15/58* (2006.01)
*G01S 15/93* (2006.01)
(Continued)

(52) U.S. Cl.
CPC ............ *G01S 15/582* (2013.01); *G01S 7/527* (2013.01); *G01S 7/5276* (2013.01); *G01S 15/52* (2013.01);
(Continued)

(58) Field of Classification Search
USPC .......................................... 367/90
See application file for complete search history.

(56) References Cited

U.S. PATENT DOCUMENTS 3,866,223 A 5/1975 Kemme et al.
4,739,860 A 4/1988 Kobayashi et al.
(Continued)

FOREIGN PATENT DOCUMENTS

CN 101598793 A 12/2009
CN 102549451 A 7/2012
(Continued)

OTHER PUBLICATIONS

English Translation of EP 1231481.*
International Search Report for PCT/EP2014/057025, dated Jul. 9, 2014.

*Primary Examiner* — James R Hulka
(74) *Attorney, Agent, or Firm* — Norton Rose Fulbright US LLP; Gerard Messina

(57) ABSTRACT

A method for operating a surroundings-detection system of a vehicle includes at least one transceiver unit emitting a frequency-modulated signal and receiving echo signals of the emitted frequency-modulated signal. The received echo signals are associated with reflection sources, and a piece of information about the speed of the reflection source relative to the transceiver unit is ascertained on the basis of the received echo signals.

21 Claims, 7 Drawing Sheets

(51) Int. Cl.
  *G01S 7/527* (2006.01)
  *G01S 15/52* (2006.01)
  *G01S 17/10* (2006.01)
  *G01S 17/32* (2006.01)
  *G01S 17/50* (2006.01)
  *G01S 17/93* (2006.01)
  *G01S 7/292* (2006.01)
  *G01S 7/487* (2006.01)
  *G01S 13/34* (2006.01)
  *G01S 13/524* (2006.01)
  *G01S 13/536* (2006.01)
  *G01S 13/93* (2006.01)

(52) U.S. Cl.
  CPC .......... *G01S 15/586* (2013.01); *G01S 15/931* (2013.01); *G01S 7/292* (2013.01); *G01S 7/487* (2013.01); *G01S 13/345* (2013.01); *G01S 13/524* (2013.01); *G01S 13/536* (2013.01); *G01S 17/102* (2013.01); *G01S 17/325* (2013.01); *G01S 17/50* (2013.01); *G01S 17/936* (2013.01); *G01S 2013/9314* (2013.01); *G01S 2015/932* (2013.01)

(56) References Cited

U.S. PATENT DOCUMENTS

| | | | |
|---|---|---|---|
| 5,359,331 A | 10/1994 | Adler | |
| 5,444,742 A * | 8/1995 | Grabow | B60R 25/00 340/904 |
| 5,657,022 A | 8/1997 | Van Etten et al. | |
| 6,169,515 B1* | 1/2001 | Mannings | G01C 21/34 342/357.31 |
| 6,420,998 B2* | 7/2002 | Winter | G01S 7/4008 342/118 |
| 6,445,337 B1* | 9/2002 | Reiche | G01S 13/60 180/197 |
| 6,611,759 B2* | 8/2003 | Brosche | G01S 13/53 340/436 |
| 6,693,581 B2* | 2/2004 | Gottwald | B60R 25/24 342/118 |
| 7,012,561 B2* | 3/2006 | Toennesen | G01S 13/582 342/130 |
| 7,474,253 B2* | 1/2009 | Natsume | B60R 21/0134 342/70 |
| 7,612,485 B2* | 11/2009 | Sugiura | B06B 1/0648 310/324 |
| 8,320,218 B2* | 11/2012 | Massa | G01F 1/662 367/140 |
| 9,097,569 B2* | 8/2015 | Mueller | B06B 1/0655 |
| 9,791,549 B2* | 10/2017 | Bi | G01S 7/35 |
| 2005/0068226 A1 | 3/2005 | Shinonaga et al. | |
| 2005/0116855 A1* | 6/2005 | Toennesen | G01S 13/582 342/70 |
| 2006/0284760 A1* | 12/2006 | Natsume | B60R 21/0134 342/70 |
| 2008/0073998 A1* | 3/2008 | Sugiura | B06B 1/0648 310/322 |
| 2008/0114510 A1* | 5/2008 | Wilhelm | B60R 21/0134 701/41 |
| 2010/0052972 A1 | 3/2010 | Kasano et al. | |
| 2010/0208553 A1* | 8/2010 | Massa | G01F 1/662 367/93 |
| 2012/0136621 A1* | 5/2012 | Inomata | B61L 25/025 702/143 |
| 2012/0314541 A1 | 12/2012 | Matsuura et al. | |
| 2013/0014592 A1* | 1/2013 | Mueller | B06B 1/0655 73/861.27 |
| 2013/0038857 A1* | 2/2013 | Funayama | G01S 17/936 356/4.07 |
| 2013/0144502 A1* | 6/2013 | Shida | B60K 31/0008 701/96 |
| 2015/0124564 A1* | 5/2015 | Bartylla | G01S 15/931 367/99 |
| 2015/0168539 A1* | 6/2015 | Himmelstoss | G01S 7/023 342/159 |

FOREIGN PATENT DOCUMENTS

| | | |
|---|---|---|
| CN | 102901969 A | 1/2013 |
| CN | 103119462 A | 5/2013 |
| CN | 103168250 A | 6/2013 |
| DE | 195 33 126 | 3/1997 |
| DE | 103 32 886 | 12/2004 |
| EP | 123 14 81 | 8/2002 |
| EP | 1 248 119 | 10/2002 |
| GB | 2493277 A | 1/2013 |

* cited by examiner

METHOD FOR OPERATING A SURROUNDINGS-DETECTION SYSTEM OF A VEHICLE

BACKGROUND OF THE INVENTION

1. Field of the Invention

The present invention relates to a method for operating a surroundings-detection system of a vehicle, which includes at least one transceiver unit, which emits signals and receives echo signals of the emitted signal. The present invention also relates to a computer program and a surroundings-detection system, which is configured to carry out the method.

2. Description of the Related Art

Ultrasonic-based measuring systems are used for measuring a distance to an object situated in front of a sensor system. The sensors used in this case are based in most cases on a pulse/echo method. In this operation, the sensor emits an ultrasonic pulse and measures a reflection of the ultrasonic pulse generated by an object, which is referred to as an echo signal. The distance between the sensor and the object is computed over the measured echo transit time and the speed of sound. In addition to the distance of the object to the sensor, the speed of the object relative to the sensor system is also of interest for the surroundings-detection. Due to the Doppler Effect, a frequency shift of the echo frequency occurs relative to the transmission frequency. The speed of the object relative to the sensor system may be ascertained by the frequency shift in systems, which are based on the pulse/echo method.

Published European patent application document EP 1 248 119 A1 shows a method for detecting signals in systems subjected to an unknown Doppler frequency shift, which adversely affects modulated coherent signals, which are used, for example, for distance measuring purposes. A coherent demodulator processes the received signal in the receive filter path in order to reconstruct a time-delayed replica of the modulated waveform. The modulated waveform and its time-delayed replica are processed in a correlator in order to determine the distance between the system and an obstacle. In a relative movement between the system and the obstacle, the value of the frequency shift is determined from $$\omega_{D_0} = \frac{2v_0}{c}\omega_0$$

The Doppler frequency $\omega_{DO}$ is computed from a rate of change of a correlation function, which is repeatedly computed for successive short processing intervals. EP 1 248 119 A1 relates to systems which operate in the microwave range.

Published German patent application document DE 195 33 126 A1 shows a Doppler sensor for detecting the movement of an object in a defined distance range, a signal source being provided, which generates a microwave signal with which a suitable code signal, for example, a chirp signal, is mixed and emitted. The signal reflected by an object and received is fed to a correlator in order to correlate it with the code signal delayed by a delaying element.

BRIEF SUMMARY OF THE INVENTION

In a method according to the present invention for operating a surroundings-sensor system of a vehicle including at least one transceiver unit, it is provided that the transceiver unit emits a frequency-modulated signal and the transceiver unit and/or one or multiple additional transceiver units receive(s) echo signals of the emitted frequency-modulated signal, that the received echo signals are associated with reflection sources and a piece of information about the speed of the reflection source relative to the transceiver unit is ascertained on the basis of the received echo signals. The emitted frequency-modulated signal in this case includes at least one first section having increasing frequencies and one second section having decreasing frequencies, or one first section having decreasing frequencies and one second section having increasing frequencies.

Instead of transmission signals having fixed frequencies, transmission signals having a changing frequency are selected according to the present invention, for example, frequency-modulated signals having linear, logarithmic or quadratic modulation. Generally, in the case of frequency-modulated signals, a phase velocity in the transmission signal and in the echo signal changes.

The section having increasing frequencies is also referred to within the scope of the present invention as a chirp-up and the section having decreasing frequencies as a chirp-down. A chirp within the scope of the present invention refers to a signal, whose frequency changes over time. In a chirp-up, the frequency increases over time, whereas it decreases over time in the case of a chirp-down. With the steps of the present invention, a shift over time of the received echo signals for the first section takes place counter to the shift over time for the second section. On the basis of the shift over time, it is possible to determine the information about the speed of the reflection source relative to the transceiver unit.

The presence or a movement of an object in the detection range of the transceiver unit, for example, is ascertained on the basis of the information obtained from the echo signals, which may result in the emission of warnings to the occupants of the vehicle, in the activation of accident avoidance systems and/or in the activation of accident damage reduction systems.

According to one preferred specific embodiment, the emitted frequency-modulated signal has a pulse duration of 0.6 ms to 3 ms. An emission of a frequency-modulated signal having a pulse duration of between 1 ms and 2 ms is particularly advantageous. With such pulse lengths, it is possible to obtain a very good signal/noise ratio. A pulse within the scope of the present invention refers to a time-limited signal. Contrasted with this are FMCW methods (frequency-modulated continuous wave). Time-limited pulses (FM pulse, frequency-modulated pulse) are preferred, since the sensor, shortly after sending the pulse on the same signal path, is again ready to receive the echo.

According to additional specific embodiments, more than two sections having frequencies to be detected are sent, for example, for validating measuring results, which may be obtained in each case on the basis of two sections of the multiple sections. The emitted signal may therefore also include three sections, for example, such as chirp-up, chirp-down, chirp-up or chirp-down, chirp-up, chirp-down, or four sections, for example, chirp-up, chirp-down, chirp-up, chirp-down or chirp-down, chirp-up, chirp-down, chirp-up, or even more sections.

It is particularly preferred if the emitted frequency-modulated signal has a linear or logarithmic chirp-up, followed by a linear or logarithmic chirp-down, or a linear or logarithmic chirp-down, followed by a linear or logarithmic chirp-up. The linear chirp is not only technically easily implementable, it is also distinguished by additional easily measurable properties such as, for example, a rising time constant, which may also be referred to within the scope of the present invention as steepness of the chirp, and defined cutoff frequencies. The steepness and the cutoff frequencies may be varied from pulse to pulse.

According to one preferred specific embodiment, the received echo signals pass through at least one first FIR filter device having a first FIR signal, and a first point in time of the best correlation of the received echo signals with the first FIR signals is ascertained. The first FIR signal is configured to filter out the echo signal of the first section of the emitted frequency-modulated signal.

The received echo signals further preferably pass through at least one second FIR filter device having a second FIR signal, and a second point in time of the best correlation of the received echo signals with the second FIR signals is ascertained. The second FIR signal corresponds to the second section of the emitted frequency-modulated signal and is suitable for detecting the corresponding echo signal.

According to one preferred specific embodiment, a time difference is ascertained on the basis of the ascertained first and second points in time and, based on the ascertained time difference, the information about the speed of the reflection source relative to the transceiver unit. The information about the speed of the reflection source relative to the transceiver unit is particularly preferably ascertained on the basis of the ascertained time difference with the aid of a linear approach. In this approach, a basic time difference between the first and the second section resulting from the emitted frequency-modulated signal itself, namely from the time offset of the second section of the emitted frequency-modulated signal to the first section of the emitted frequency-modulated signal, is subtracted from the ascertained time difference. Thus, the relative speed results according to one preferred specific embodiment on the basis of the formula $$v_{rel} = (\text{time difference} - \text{basic time difference}) \times \text{conversion factor}.$$

Whether a received echo signal may be associated with a reflection source depends on the quality of the echo signal, which generally includes useful signal components and interference signal components. To determine the useful signal components according to one preferred specific embodiment of the present invention, phase information and amplitude information are determined from the received echo signals. An evaluation of the echo signal preferably takes place via a filter logic connected downstream from the transceiver units. The evaluation of the echo signal is essential in determining the useful signal components in the echo signal. After a suitable filtering section, for example, a piece of amplitude information in the form of a cross correlation function $x_{corr}(t)$, and a piece of phase information in the form of a cross correlation coefficient $R(t)$, may be provided for an assessment of the signal quality. The amplitude information $x_{corr}(t)$ represents a variable, which is a function of the amplitude of the received signal. The phase information $R(t)$ provides insight into the quality of the phase of the received signal, ideally separately from the amplitude. Since both variables furnish meaningful information about the detected objects, both the phase information and the amplitude information are determined according to one specific embodiment on the basis of the received echo signals and used in the determination of the useful signal components.

The amplitude information $x_{corr}(t)$ is ascertained on the basis of the received echo signals, preferably by computing a convolution of a received or a processed received signal $e(t)$ with an expected signal $s(t)$, for example, according to $$x_{corr}(t) = \int s(\tau)e(t-\tau)d\tau.$$

The correlation function is computed via a convolution of the received signal or of the pre-processed received signal with an expected signal.

The expected signal $s(t)$ is an excitation function adapted to a transmission function of the converter, which takes, in particular, a signal distortion due to properties of the transceiver unit into account. The computation may take place, for example, in a so-called adapted filter.

A piece of phase information, i.e., the cross correlation coefficient $R(t)$, is ascertained on the basis of the received echo signals, preferably via $$R(t)^2 = x_{corr}(t)^2 / (\|s(t)\|^2 \cdot \|e(t)\|^2)$$

$e(t)$ being the received signal, $s(t)$ the expected signal, $x_{corr}(t)$ the convolution of the received signal $e(t)$ with the expected signal $s(t)$, and $\|s(t)\|^2$ and $\|e(t)\|^2$ the squares of the norms of the individual signals. The amplitude information is preferably reduced from this. The phase information, i.e., the cross correlation coefficient $R(t)$, is ascertained on the basis of $R(t)^2$ via root extraction.

According to the present invention, a computer program is also provided, according to which one of the methods described herein is carried out, when the computer program is executed on a programmable computer device. The computer program may, for example, be a module for implementing a driver assistance system or a subsystem thereof in a vehicle, or an application for driver assistance functions, which are executable on a smartphone or a tablet PC, for example. The computer program may be stored on a machine-readable memory medium, for example, on a permanent or rewritable memory medium or in association with a computer device or on a removable CD-Rom or DVD or on a portable mobile memory medium, such as a memory card or a USB stick. In addition, or alternatively, the computer program may be provided for downloading on a computer device such as, for example, a server, for example via a data network such as, for example, the Internet or a communication connection such as, for example, a telephone line or a wireless connection.

According to another aspect of the present invention, a surroundings-detection system of a vehicle includes at least one transceiver unit, which is configured to emit and receive frequency-modulated signals, the emitted frequency-modulated signal[s] including at least one first section having increasing frequencies and one second section having decreasing frequencies, or one first section having decreasing frequencies and one second section having increasing frequencies, and a filter device, which is coupled to the at least one transceiver, so that received echo signals may pass through the filter device, the filter device being configured to associate the received echo signals with reflection sources, and being configured to ascertain a piece of information about the speed of the reflection source relative to the transceiver unit on the basis of the received echo signals.

The present invention is used in surroundings-detection systems which employ sensors based on a pulse/echo method. This relates, in particular, to ultrasonic systems, but also to radar systems and Lidar systems. Typically in such systems, sensors are used which are able to emit pulses as well as receive pulses, so-called transceiver units. However, it may also be provided to use the sensors according to the present invention merely as a receiving unit or merely as a transmitting unit.

The present invention is particularly advantageously useable in ultrasonic-based systems, which are unable during the transmission process to also simultaneously receive the echo response, since the diaphragm amplitude during the transmission process is higher by several magnitudes than what a reflected signal could produce as an echo on the diaphragm. The oscillation imposed on the diaphragm during the transmission process is adversely affected only negligibly by the incoming sound. An FMCW method (frequency-modulated continuous wave) conventional in radar technology is not applicable in this case, since the transmit and receive path in ultrasonic systems is designed on the same mechanically oscillatable system, whereas it is separate in radar systems.

The present invention may be used, in particular, in sensors, which are provided, for example, in the front and/or rear bumper of a motor vehicle for the purpose of parking assistance and/or collision avoidance. Sensors according to the present invention may, in particular, be installed in an ultrasonic system, which includes a group of ultrasonic sensors, at least one, preferably all, ultrasonic sensors having the features according to the present invention. The ultrasonic system may, for example, be configured to detect partial surroundings of the motor vehicle. For example, ultrasonic sensors in the front area for detecting surroundings ahead of the vehicle and/or ultrasonic sensors in the side area for detecting a side area of the motor vehicle and/or ultrasonic sensors in the rear area for detecting a rearward surroundings of the motor vehicle, may each be associated with such an ultrasonic system. Typically in such case, four to six ultrasonic sensors are installed in one bumper, a maximum of only four ultrasonic sensors being mounted having approximately the same viewing direction. In order to also detect, in particular, the area next to the vehicle, ultrasonic sensors are also positioned in the front bumper so that they have a detection area to the left and to the right. In addition, or alternatively, ultrasonic sensors may also be positioned in the rear bumper in such a way that they detect an area to the left and to the right next to the motor vehicle. The ultrasonic system also includes a control device associated with each group, and a signal processing device. In order to detect the side area of the vehicle, ultrasonic sensors installed laterally in the front and rear bumpers, as well as ultrasonic sensors which are installed in a side mirror or in a door section, may be used.

The surroundings-detection system according to the present invention permits a rapid and accurate indication of objects in and near the driving path of a vehicle, the driving path normally referring to the area soon to be passed over by the vehicle. Accurate may refer both to a localization accuracy in a detection area of the sensors (FOV, field of view) as well as a detection probability, i.e., a number of detections of an obstacle in a specific time interval.

The surroundings-detection system preferably includes at least one FIR filter device, which is configured to ascertain at least two points in time of best correlation of the received echo signal with two FIR signals. It may also be provided that the filter device includes two FIR filter devices, each of which is configured to ascertain points in time of best correlation of the received echo signal with one first and with one second FIR signal.

The system is combinable with additional systems for ascertaining the frequency shift, for example, with systems which provide a spectral analysis and a detection of the shift of the transmission spectrum, with systems which provide an analysis of the phase velocity via a Hilbert transform, with systems which carry out a period duration analysis in the time domain, and with systems which use a spectral analysis via a filter bank of spectrally offset adapted filters and which carry out a subsequent interpolation. The ascertained information about distances and relative speeds may be validated using the additional systems.

According to another aspect of the present invention, a motor vehicle includes at least one such surroundings-detection system.

The method and the device according to the present invention make it possible to rapidly and reliably ascertain the relative speed of an object in the detection area of the sensors, without the need for a repeated detection over time of the object distance and a change of the object distance computed therefrom. Compared to purely distance-based methods, a more exact ascertainment of the relative speed is shown to be possible.

Because it is possible to differentiate very rapidly between fast approaching and receding objects, it is also possible to very rapidly warn the occupants of the vehicle, for example, as part of a blind spot monitoring such as, for example, as part of a so-called side view assistant. Another application is the assistance of airbag sensors for triggering an airbag. In this case, very high relative speeds, for example, in excess of 30 km/h may occur, so that often only a few echoes of the object may be measured. With the steps according to the present invention, it is possible to overcome the difficulties of assessing the relative speed on the basis of the derivation of the location.

The present invention also provides one additional measurand, namely, the time difference between two strictly defined echo signal components, so that as a result an additional measuring option is provided for separating interferences and real objects.

DETAILED DESCRIPTION OF THE INVENTION

Figure 1:
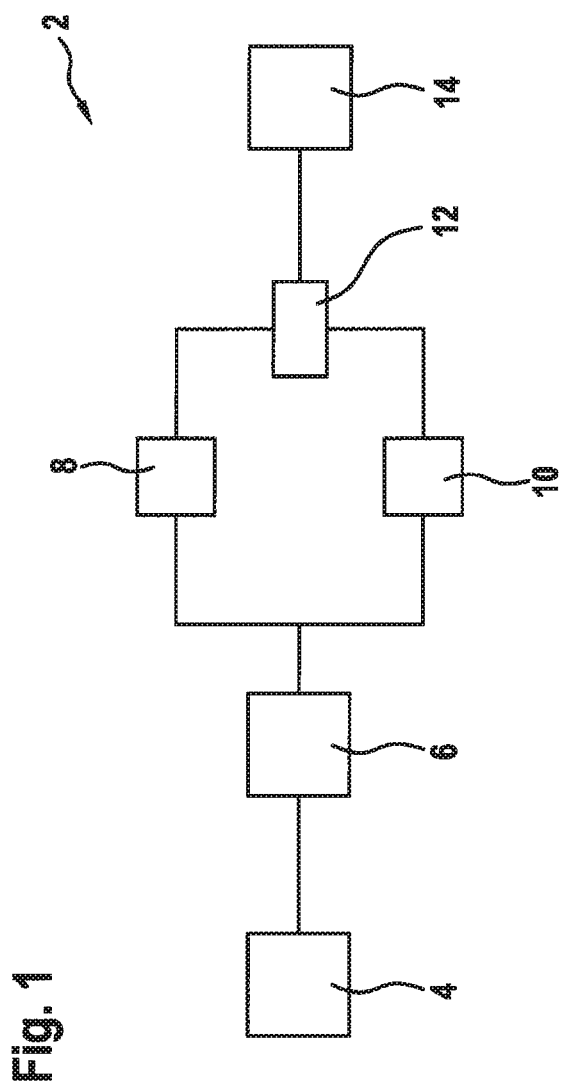
FIG. 1 schematically shows a representation of a surroundings-detection system of a vehicle including a transceiver.

FIG. 1 shows a surroundings-detection system 2, which includes a transceiver unit 4, which is configured to emit and to receive frequency-modulated signals. Surroundings-detection system 2 includes a pre-filter 6, which is configured, for example, to filter out useful signal components from the received echo signals and to suppress interference signal components. Pre-filter 6 receives the signals of transceiver unit 4. Received signals are processed in pre-filter 6, for example, amplified, digitized, sampled, filtered through low-pass, high-pass or band-pass filters and, for example, subjected to signal transformations, such as a Hilbert transform. If a signal encoding of the signal is provided, the signals are decoded in pre-filter 6.

Surroundings-detection system 2 also includes one first FIR filter device 8 and one second FIR filter device 10, which are configured to ascertain points in time of best correlation of received echo signals with the FIR signals. The signal outgoing from pre-filter 6 is fed to the two FIR filter devices 8, 10. Such FIR filter devices (FIR, finite impulse response) may also be referred to as filters having a finite pulse response and are preferably digitized and operated with the aid of a computer program. FIR filter devices 8, 10 are preferably signal-matched filters. First FIR filter device 8 decodes a section having an increasing frequency, also referred to as a so-called up-ramp, and second FIR filter device 10 decodes a section having a decreasing frequency, also referred to as a down-ramp. If an echo is detected, the transit time is then determined by searching for the maximum of the respective filter output and offsetting the two measured times of the outputs of the two FIR filter devices 8, 10. The computation yields the relative speed.

Surroundings-detection system 2 includes for this purpose a device 12 for ascertaining a speed of a reflection source. Device 12 for ascertaining the speed of the reflection source receives the data or measured values of FIR filter devices 8, 10 and processes these further. Device 12 for ascertaining the speed of the reflection source supplies the data to a control system 14 for further processing, for example, a higher-level control system such as, for example, an ADAS system (Advanced Driving Assistance System), or a coordinate control system. For example, it may be provided that device 12 for ascertaining the speed of a reflection source provides the ascertained data on a bus system, for example, on a CAN bus.

Figure 2:
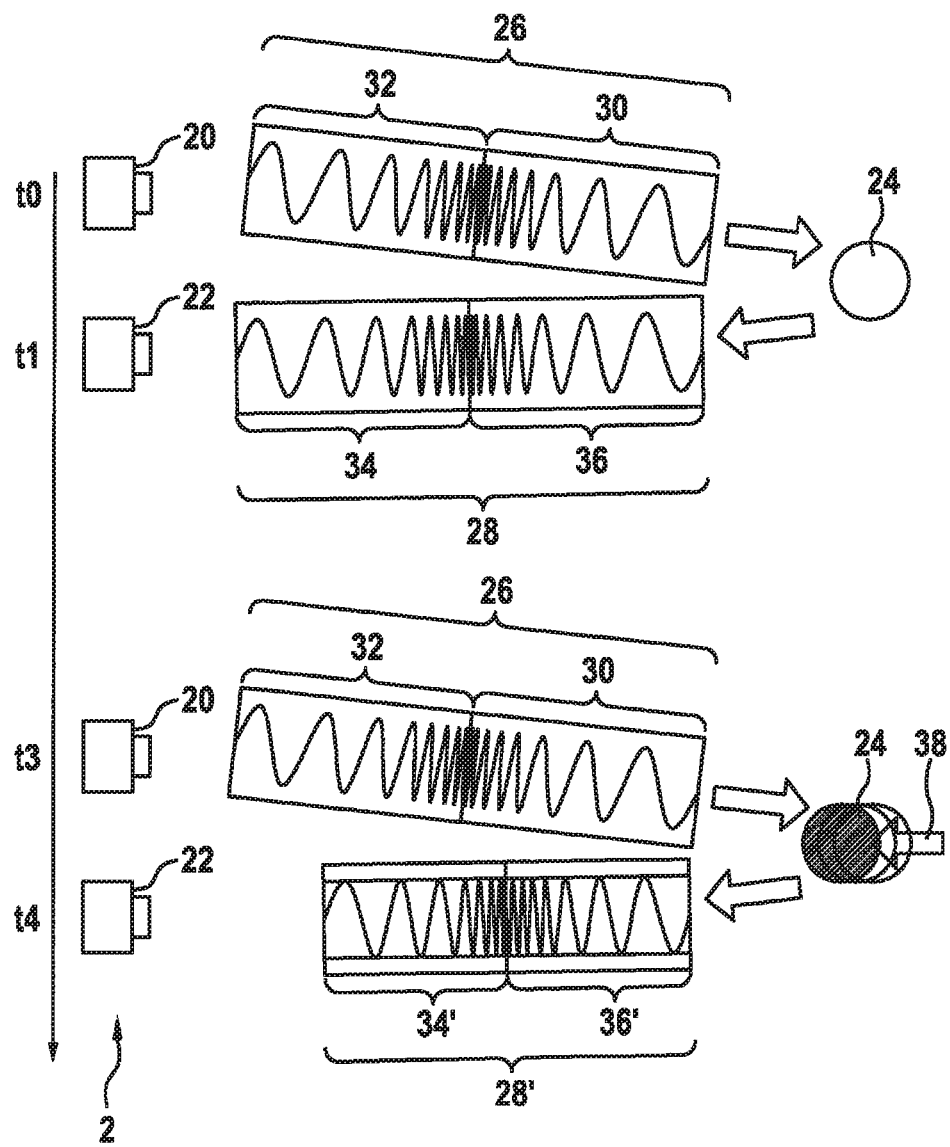
FIG. 2 schematically shows a representation of a scenario including a surroundings-detection system and an object.

FIG. 2 schematically shows a representation of a situation including a surroundings-detection system 2 and an object 24, which is situated in a detection area of surroundings sensor system 2. Object 24 within the scope of the present invention is also referred to as a reflection source. At a point in time t0, a transmitting unit 20 emits a frequency-modulated signal 26. Frequency-modulated signal 26 is reflected by object 24. At a point in time t1, a receiver unit 22, which need not necessarily coincide with transmitting unit 20, but may well be the same unit, receives an echo signal 28, which is reflected by object 24.

Emitted frequency-modulated signal 26 includes one first section 30 having an increasing frequency, i.e., having a chirp up. Emitted frequency-modulated signal 26 also includes one second section 32 having a decreasing frequency, i.e., having a chirp-down. Received echo signal 28 at point in time t1 includes one first section 34, which corresponds to first section 30 of emitted frequency-modulated signal 26, and one second section 36, which corresponds to second section 32 of emitted frequency-modulated signal 26.

In a second exemplary situation, transmitting unit 20 emits frequency-modulated signal 26 at a point in time t2. Frequency-modulated signal 26 is reflected by object 24, object 24 now exhibiting at the point in time of the reflection a speed 38 relative to transmitting unit 20 or receiver unit 22. At a point in time t3, receiver unit 22 receives echo signal 28, which was reflected by moving object 24. Due to the movement of object 24 relative to transmitting unit 20 or receiver unit 22, which are generally a transceiver unit, received echo signal 28 is compressed relative to emitted signal 26, i.e., as a whole it is raised in frequency, or stretched, i.e., as a whole reduced in frequency, so that receiver unit 22 receives a Doppler-shifted echo signal 28' having first section 34' and second section 36'.

Figure 3:
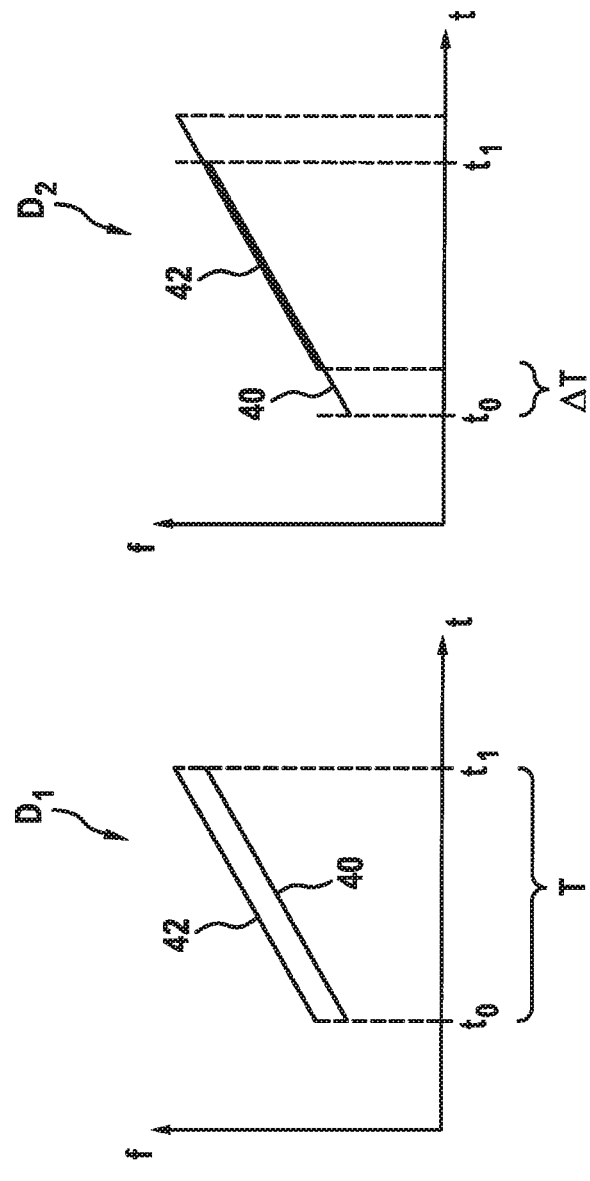
FIG. 3 shows a diagram for explaining a signal shift.

FIG. 3 shows two diagrams $D_1$, $D_2$ for illustrating a signal shift. First diagram $D_1$ shows a frequency curve 40 of one section of an emitted signal, which may correspond, for example, to first section 30 of the signal depicted in FIG. 2. The frequency curve in this exemplary embodiment increases linearly from a point in time $t_0$ to a point in time $t_1$, i.e., continuously and with a constant slope. Frequency curve 40 depicted in FIG. 3 may be associated with a pulse duration T of the section. Frequency-modulated signals suitable for implementing the method according to the present invention may include a frequency curve depicted in FIG. 3 in the first section or in the second section. However, they may equally well have another frequency curve, for example, a linearly decreasing or a polynomial, in particular, quadratic polynomial, exponential or logarithmic curve. Also depicted in FIG. 3 is a frequency curve 42 of one section of the echo signal corresponding to the emitted signal, it being apparent that the frequency curve of the echo signal is now on the whole higher than frequency curve 40 of the section of the emitted signal. Frequency curve 42 of the received echo signal may, for example, correspond to section 34 of the received echo signal described with reference to FIG. 2 in the case of moving object 24.

Second diagram $D_2$ shows frequency curve 40 of the emitted signal and frequency curve 42 of the received echo signal, the signals being shifted relative to one another by a time $\Delta t$, so that they coincide in preferably many functional values. The point in time at which the two frequency curves 40, 42 overlap, i.e., coincide preferably in many functional values, is also referred to within the scope of the present invention as the point in time of best correlation.

Figure 4:
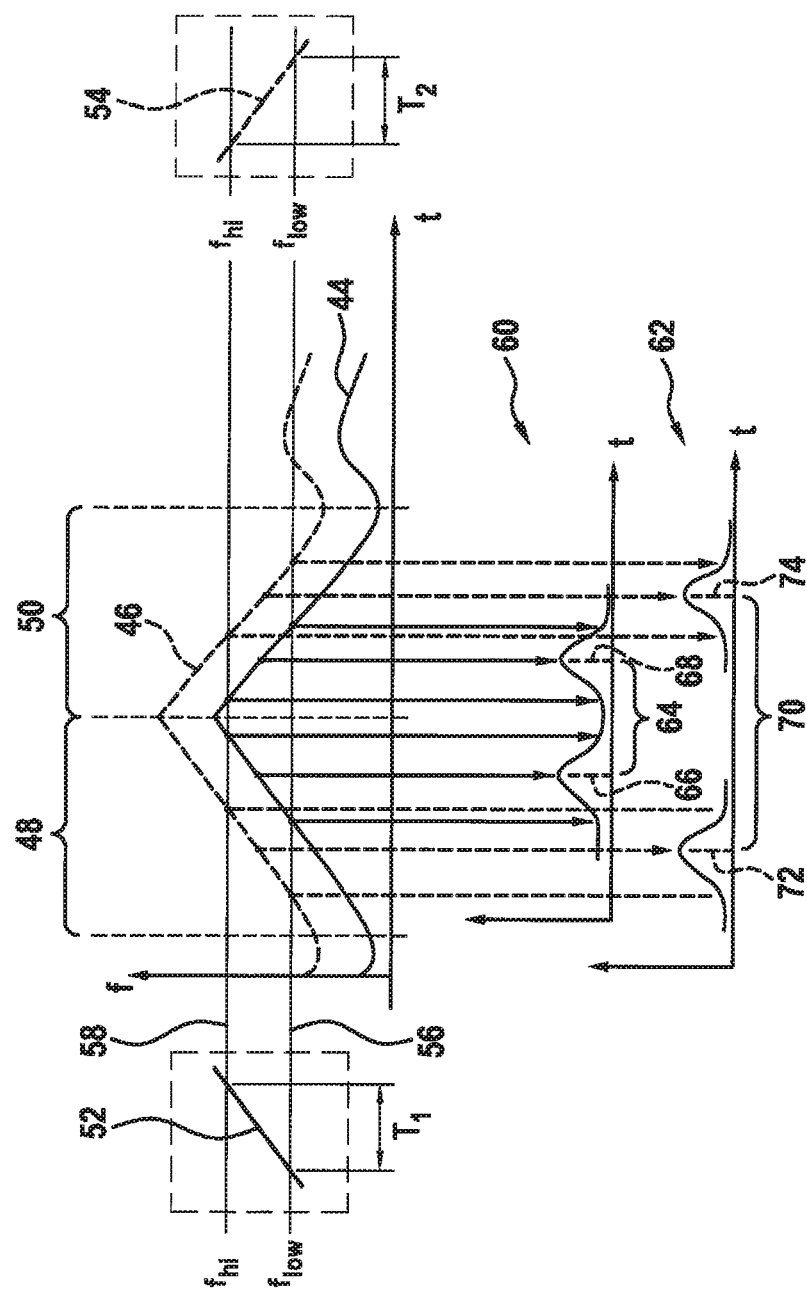
FIG. 4 shows another diagram for explaining the signal shift.

FIG. 4 shows the occurrence of the signal shift over time as a consequence of the frequency shift based on a chirp-up-chirp-down signal. FIG. 4 shows a frequency curve 44 of an emitted signal, which includes one first section 48 having increasing frequencies and one second section 50 having decreasing frequencies. FIG. 4 also depicts a frequency curve 46 of a received echo signal, which also includes one first section 48 having increasing frequencies and one second section 50 having decreasing frequencies.

A FIR filter signal 52 is also depicted having a time-related filter window $T_1$ and a frequency filter window between a lower cutoff frequency 56 and an upper cutoff frequency 58. First FIR filter signal 52 is a linear signal, which is matched to the signal of frequency curve 44 in first section 48 of the emitted signal. A second FIR filter signal 54 is also depicted having a time-related filter window $T_2$ and a frequency filter window between the lower and upper cutoff frequencies 56, 58. Second FIR filter signal 54 is a linear signal, which is matched to second section 50 of frequency curve 44 of the emitted signal.

FIG. 4 also shows a total filter response amplitude 60 to the emitted signal, as well as a total filter response amplitude 62 to the received echo signal. As described with reference to FIG. 2, frequency curve 44 of the emitted signal coincides with the frequency curve of a signal reflected on a non-moving object if, in addition, the surroundings-detection system is also not moved, i.e., when no Doppler shift occurs.

A basic time difference 64 is ascertainable on the basis of total filter response amplitude 60 to frequency curve 44 of the emitted signal or of the signal reflected on the non-moving object, namely as a difference between one first point in time 66 of best correlation of first FIR filter signal 52 with frequency curve 44 of the emitted signal, and one second point in time 68 of best correlation of second FIR filter signal 54 with frequency curve 44 of the emitted signal. In the absence of a Doppler shift, two signal curves, for example, result, having a basic time difference 64 of, for example, 1 ms, if the time interval between the chirp-up pulse and the chirp-down pulse was 1 ms.

In the case of a Doppler shift, a rise in the frequency curve occurs as depicted. A time difference 70 based on total filter response amplitude 62 to frequency curve 46 of the received echo signals is ascertainable as a difference between one first point in time 72 of best correlation of first FIR filter signal 52 with frequency curve 46 of the echo signal and one second point in time 74 of best correlation of second FIR filter signal 54 with frequency curve 46 of the echo signal. Due to the rise of the frequency curve, the filter for the chirp-up ascertains first point in time 72 of best correlation (so-called matching) somewhat earlier, whereas the filter for the chirp-down ascertains second point in time 74 of best correlation somewhat later, so that time difference 70 is greater than basic time difference 64.

Figure 5:
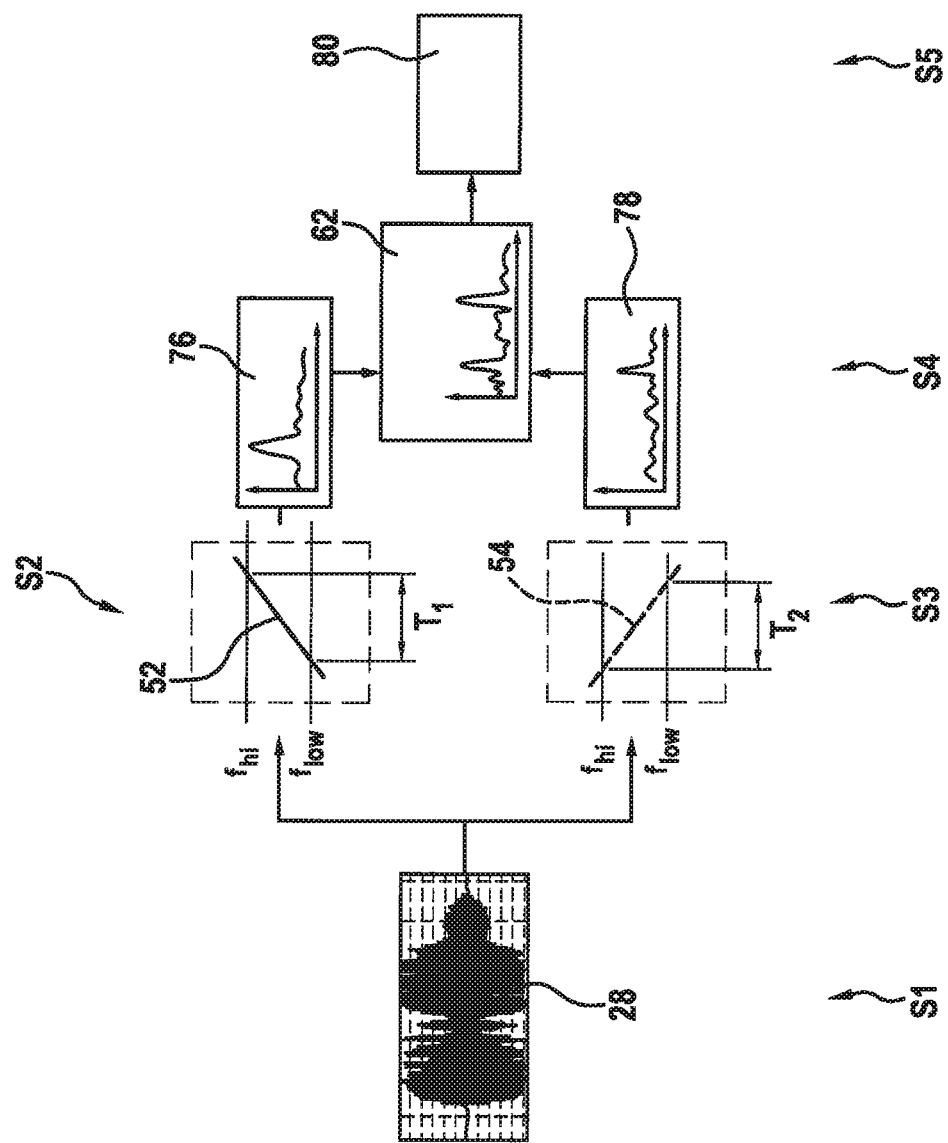
FIG. 5 shows method steps for ascertaining the speed of a surroundings-detection system relative to an object.

FIG. 5 shows additional method steps for ascertaining the speed of the surroundings-detection system relative to the object. In a first step S1, echo signal 28 is received, as described with reference to FIG. 2. In a second step S2, received echo signal 28 is filtered with FIR filter signal 52, and from which a first FIR filter response amplitude 76 is obtained. In a step S3, received signal 28 is filtered with the aid of a second FIR filter and a second FIR filter response amplitude 78 is ascertained. Total filter response amplitudes 60, 62, which are depicted in FIG. 4, are ascertained in a step S4 on the basis first FIR filter response amplitude 76 and second FIR filter response amplitude 78 by superimposing first and second FIR filter response amplitudes 76, 78. In a further step S5, the time difference and the basic time difference are ascertained and converted into the relative speed.

This takes place in accordance with $$v_{rel} = (\text{time difference} - \text{basic time difference}) \times \text{conversion factor.}$$

In step S5, the ascertained information is also supplied to additional driver assistance systems.

The conversion factor is 1/20 [km/h/μs], for example. The conversion factor depends on the bandwidth of the chirps used and on the form of the chirps. For logarithmic chirps, a linear dependency between $v_{rel}$ and the measured time shift applies. For linear chirps with low bandwidth of approximately <10 kHz, the dependency as a first approximation is also linear. For other types of modulation, other correlations may, in principle, result. The relationship of frequency offset df caused by the Doppler shift to bandwidth DF of the chirp, together with the pulse duration used, determines the conversion factor. If df<<DF, then only minimal time-related shifts are measured and the conversion factor is high.

Figure 6:
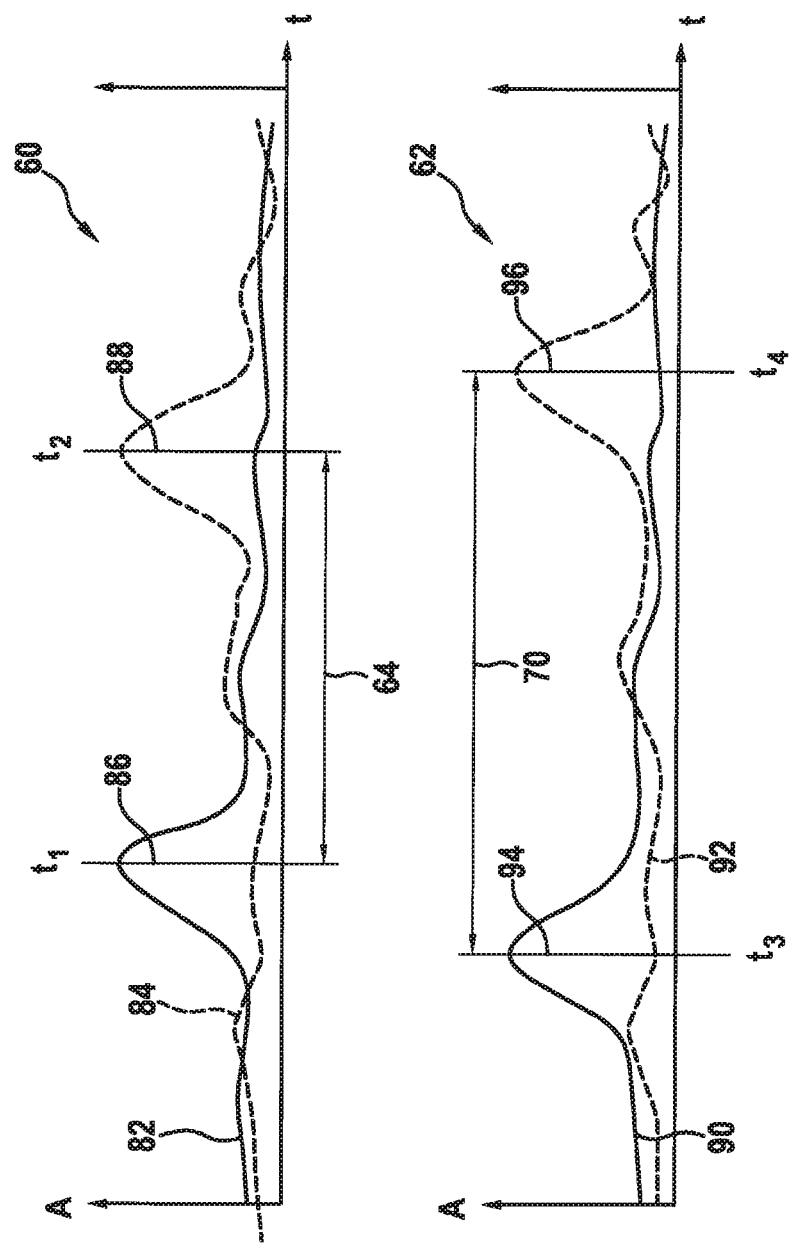
FIG. 6 shows diagrams having exemplary FIR filter response amplitudes for moving and static objects.

FIG. 6 shows two diagrams having exemplary FIR filter response amplitudes for moving and static objects. One first FIR filter response amplitude 82 to a static object has a first maximum 86 and, as a result, defines a first point in time $t_1$. One second FIR filter response amplitude 84 to the static object has a second maximum 88 at a second point in time $t_2$. On the basis of points in time $t_1$ and $t_2$, it is possible to ascertain basic time difference 64, which, as described above, is incorporated in the computation of the relative speed. The lower diagram depicted in FIG. 6 includes one first filter response amplitude 90 to a received echo signal in the case of a moving object having a first maximum 94 at a point in time $t_3$. Second FIR filter response amplitude 92 includes a second maximum 96 at a point in time $t_4$. First point in time $t_3$ and second point in time $t_4$ result, via difference formation, in time difference 70, on the basis of which the speed of the moving object relative to the surroundings-detection system may be ascertained. The difference between the time difference and the basic time difference, or also the ratio of the time difference to the basic time difference, may be used as a direct measure for the underlying Doppler velocity.

Figure 7:
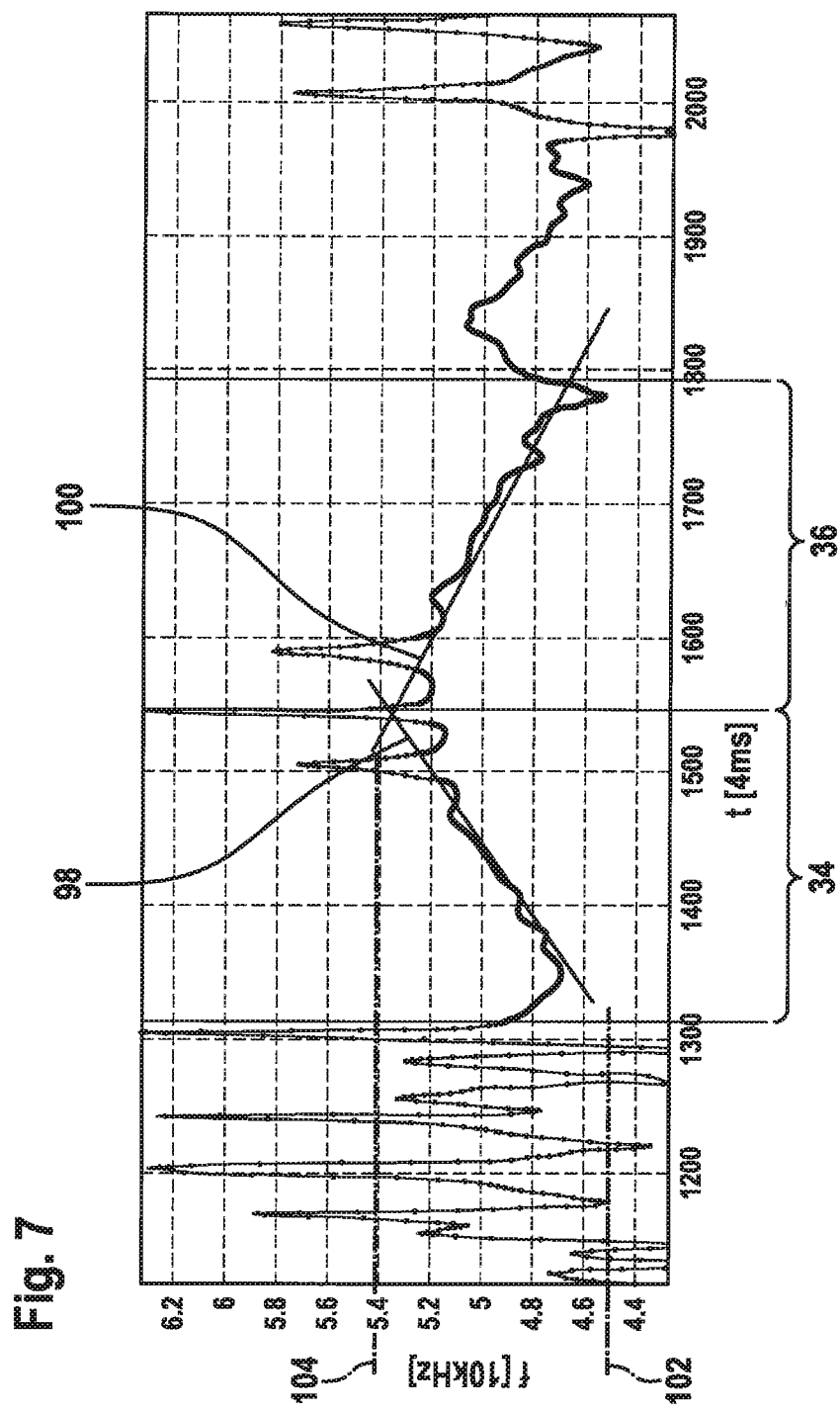
FIG. 7 shows a diagram having an exemplary frequency curve of a chirp-up followed by a chirp-down.

FIG. 7 shows, by way of example, the frequency curve over time of a received signal. The frequency curve includes one first section 34 having an increasing frequency and one second section 36 having a decreasing frequency. The implementation depicted includes a chirp-up having a pulse duration of 1 ms, one first cutoff frequency 102 of 45 kHz and one second cutoff frequency 104 of 54 kHz, followed by a chirp-down with 1 ms of 54 kHz after 45 kHz. In first section 34, a first slope 98 may be associated with the chirp-up and in second section 36, a second slope 100 may be associated with the chirp-down, which is also referred to as steepness. In the case of an ultrasonic system, ultrasonic transducers having resonance frequencies in the range of 40 kHz to 60 kHz are preferred, for example, as depicted, an ultrasonic transducer having a resonance frequency of 48 kHz. The chirp is preferably formed having cutoff frequencies 102, 104 in the range of 5% to 30%, preferably 5% to 10% below and above the resonance frequency of the ultrasonic transducer. At a resonance frequency of 48 kHz, preferred ranges are, for example, 2.5 kHz to 10 kHz, preferably 2.5 kHz to 5 kHz below and above the resonance frequency.

The present invention is not limited to the exemplary embodiments described above and to the aspects emphasized therein. Rather, a plurality of modifications is possible within the scope specified by the claims, which fall within the practice of those skilled in the art.

What is claimed is:

1. A method for operating a surroundings-detection system of a vehicle including a transceiver unit, the method comprising:
   emitting, by the transceiver unit, a frequency-modulated signal;
   receiving, by the transceiver unit, echo signals of the emitted frequency-modulated signal, wherein the emitted frequency-modulated signal includes a pulse having both at least one section having increasing frequencies and at least one section having decreasing frequencies, and wherein the received echo signals are associated with at least one reflection source;
   passing the received echo signals through at least one first finite impulse response (FIR) filter device having a first FIR signal, and through at least one second FIR filter device having a second FIR signal;
   ascertaining one first point in time of best correlation of the received echo signals with the first FIR signal and a second point in time of best correlation of the received echo signals with the second FIR signal; and
   ascertaining information about the speed of the at least one reflection source relative to the transceiver unit on the basis of a time difference between the ascertained first and second points in time of best correlation.

2. The method as recited in claim 1, wherein the emitted frequency-modulated signal has a pulse duration of 0.6 ms to 3 ms.

3. The method as recited in claim 1, wherein the pulse of the emitted frequency-modulated signal includes one of: (i) a linear chirp-up followed by a linear chirp-down, (ii) a logarithmic chirp-up followed by a logarithmic chirp-down, (iii) a linear chirp-down followed by a linear chirp-up, or
(iv) a logarithmic chirp-down followed by a logarithmic chirp-up.

4. The method as recited in claim 1, wherein the information about the speed of the at least one reflection source relative to the transceiver unit is ascertained as a linear function of the ascertained time difference.

5. The method as recited in claim 1, wherein the speed of the at least one reflection source relative to the transceiver unit is ascertained as a linear function of the ascertained time difference.

6. The method as recited in claim 1, wherein the first FIR filter device is filter matched to the at least one section of the pulse having increasing frequencies, and the second FIR filter device is filter matched to the at least one section of the pulse having decreasing frequencies.

7. The method as recited in claim 1, further comprising:
passing the emitted frequency-modulated signal through the at least one first FIR filter device and through the at least one second FIR filter device; and
ascertaining a third point in time of best correlation of the emitted frequency-modulated signal with the first FIR signal and a fourth point in time of best correlation of the emitted frequency-modulated signal with the second FIR signal;
wherein the ascertaining the information about the speed of the at least one reflection source relative to the transceiver unit is also on the basis of a time difference between the ascertained third and fourth points in time of best correlation.

8. The method as recited in claim 7, wherein the ascertaining the information about the speed of the at least one reflection source relative to the transceiver unit includes forming a difference between (i) the time difference between the ascertained first and second points in time of best correlation and (ii) the time difference between the ascertained third and fourth points in time of best correlation.

9. The method as recited in claim 1, further comprising:
combining a first filter response signal produced by passing the received echo signals through the at least one first FIR filter device and a second filter response signal produced by passing the received echo signals through the at least one second FIR filter device to produce a total filter response amplitude signal;
ascertaining the time difference between the first and second points in time of best correlation on the basis of the total filter response amplitude signal.

10. A non-transitory, machine-readable storage medium including program instructions, which when executed by a processor perform a method for operating a surroundings-detection system of a vehicle including a transceiver unit, the method comprising:
emitting, by the transceiver unit, a frequency-modulated signal;
receiving, by the transceiver unit, echo signals of the emitted frequency-modulated signal, wherein the emitted frequency-modulated signal includes a pulse having both at least one section having increasing frequencies and at least one section having decreasing frequencies, and wherein the received echo signals are associated with at least one reflection source;
passing the received echo signals through at least one first finite impulse response (FIR) filter device having a first FIR signal, and through at least one second FIR filter device having a second FIR signal;
ascertaining one first point in time of best correlation of the received echo signals with the first FIR signal and a second point in time of best correlation of the received echo signals with the second FIR signal; and
ascertaining information about the speed of the at least one reflection source relative to the transceiver unit on the basis of a time difference between the ascertained first and second points in time of best correlation.

11. The non-transitory, machine-readable storage medium as recited in claim 10, wherein:
the speed of the at least one reflection source is ascertained as a linear function of a time difference between the first and second points in time of best correlation.

12. The non-transitory, machine-readable storage medium as recited in claim 10, wherein the first FIR filter device is filter matched to the at least one section of the pulse having increasing frequencies, and the second FIR filter device is filter matched to the at least one section of the pulse having decreasing frequencies.

13. The non-transitory, machine-readable storage medium as recited in claim 10, the method further comprising:
passing the emitted frequency-modulated signal through the at least one first FIR filter device and through the at least one second FIR filter device; and
ascertaining a third point in time of best correlation of the emitted frequency-modulated signal with the first FIR signal and a fourth point in time of best correlation of the emitted frequency-modulated signal with the second FIR signal;
wherein the ascertaining the information about the speed of the at least one reflection source relative to the transceiver unit is also on the basis of a time difference between the ascertained third and fourth points in time of best correlation.

14. The non-transitory, machine-readable storage medium as recited in claim 13, wherein the ascertaining the information about the speed of the at least one reflection source relative to the transceiver unit includes forming a difference between (i) the time difference between the ascertained first and second points in time of best correlation and (ii) the time difference between the ascertained third and fourth points in time of best correlation.

15. The non-transitory, machine-readable storage medium as recited in claim 10, the method further comprising:
combining a first filter response signal produced by passing the received echo signals through the at least one first FIR filter device and a second filter response signal produced by passing the received echo signals through the at least one second FIR filter device to produce a total filter response amplitude signal;
ascertaining the time difference between the first and second points in time of best correlation on the basis of the total filter response amplitude signal.

16. A surroundings-detection system of a vehicle, comprising:
a transceiver unit configured to emit a frequency-modulated signal and receive echo signals of the emitted frequency-modulated signal, wherein the emitted frequency-modulated signal includes a pulse having both at least one section having increasing frequencies and at least one section having decreasing frequencies; and
a filtering and ascertaining device coupled to the at least one transceiver unit and configured to:
pass the received echo signals through at least one first finite impulse response (FIR) filter device having a first FIR signal, and through at least one second FIR filter device having a second FIR signal;
ascertain one first point in time of best correlation of the received echo signals with the first FIR signal and a second point in time of best correlation of the received echo signals with the second FIR signal; and ascertain information about the speed of the at least one reflection source relative to the transceiver unit on the basis of a time difference between the ascertained first and second points in time of best correlation.

17. The surroundings-detection system as recited in claim 16, wherein:

the speed of the at least one reflection source is ascertained as a linear function of a time difference between the first and second points in time of best correlation.

18. The surroundings-detection system as recited in claim 16, wherein the first FIR filter device is filter matched to the at least one section of the pulse having increasing frequencies, and the second FIR filter device is filter matched to the at least one section of the pulse having decreasing frequencies.

19. The surroundings-detection system as recited in claim 16, the filtering and ascertaining device configured to:

pass the emitted frequency-modulated signal through the at least one first FIR filter device and through the at least one second FIR filter device; and ascertain a third point in time of best correlation of the emitted frequency-modulated signal with the first FIR signal and a fourth point in time of best correlation of the emitted frequency-modulated signal with the second FIR signal;

wherein the ascertaining the information about the speed of the at least one reflection source relative to the transceiver unit is also on the basis of a time difference between the ascertained third and fourth points in time of best correlation.

20. The surroundings-detection system as recited in claim 19, wherein the ascertaining the information about the speed of the at least one reflection source relative to the transceiver unit includes forming a difference between (i) the time difference between the ascertained first and second points in time of best correlation and (ii) the time difference between the ascertained third and fourth points in time of best correlation.

21. The surroundings-detection system as recited in claim 16, the filtering and ascertaining device configured to:

combine a first filter response signal produced by passing the received echo signals through the at least one first FIR filter device and a second filter response signal produced by passing the received echo signals through the at least one second FIR filter device to produce a total filter response amplitude signal;

ascertain the time difference between the first and second points in time of best correlation on the basis of the total filter response amplitude signal.

* * * * *